US007606887B1

(12) United States Patent
Stewart et al.

(10) Patent No.: US 7,606,887 B1
(45) Date of Patent: Oct. 20, 2009

(54) AUTOMATIC ESTABLISHMENT OF NETWORK PERFORMANCE MONITORING COMMUNITIES USING ROUTING PROTOCOLS

(75) Inventors: John W Stewart, San Francisco, CA (US); Wendy R Cartee, Los Altos, CA (US); Joe Truman, Stanford, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1135 days.

(21) Appl. No.: 10/660,303

(22) Filed: Sep. 11, 2003

(51) Int. Cl.
*G06F 15/173* (2006.01)
(52) U.S. Cl. .................................. 709/223; 709/224
(58) Field of Classification Search ............... 709/223, 709/224; 715/736
See application file for complete search history.

(56) References Cited

U.S. PATENT DOCUMENTS

| | | | |
|---|---|---|---|
| 5,886,643 A * | 3/1999 | Diebboll et al. ............. 709/224 |
| 6,115,393 A * | 9/2000 | Engel et al. ................. 370/469 |
| 6,269,398 B1 * | 7/2001 | Leong et al. ................ 709/224 |
| 6,269,401 B1 * | 7/2001 | Fletcher et al. ............. 709/224 |
| 6,271,845 B1 * | 8/2001 | Richardson ................. 715/764 |
| 6,363,056 B1 * | 3/2002 | Beigi et al. ................. 370/252 |
| 6,366,563 B1 | 4/2002 | Weldon et al. |
| 6,445,681 B1 | 9/2002 | Pogrebinsky |
| 6,636,499 B1 * | 10/2003 | Dowling ..................... 370/338 |
| 6,744,739 B2 * | 6/2004 | Martin ....................... 370/254 |
| 7,069,343 B2 * | 6/2006 | Goringe et al. ............. 709/249 |
| 7,200,122 B2 * | 4/2007 | Goringe et al. ............. 370/255 |

* cited by examiner

*Primary Examiner*—Yemane Mesfin
(74) *Attorney, Agent, or Firm*—Shumaker & Sieffert, P.A.

(57) ABSTRACT

Techniques are described for monitoring performance of a network. Particularly, network devices within the network exchange routing communications in accordance with one or more routing protocols, such as the Border Gateway Protocol (BGP), to automatically establish a community for monitoring performance throughout the network. Upon establishing the community, the network devices of the community exchange performance probes to collect comprehensive performance information for the network. This performance information may be aggregated via one or more computing devices. Using the aggregated performance information, numerous network performance characteristics may be computed, including delay, jitter, throughput, availability and packet loss.

47 Claims, 5 Drawing Sheets

AUTOMATIC ESTABLISHMENT OF NETWORK PERFORMANCE MONITORING COMMUNITIES USING ROUTING PROTOCOLS

TECHNICAL FIELD

The invention relates to computer networks and, more particularly, to performance monitoring of computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

An Internet service provider (ISP) is a company that provides customers, e.g., individuals or other companies, access to the Internet and other related services. The ISP may provide customers with service level agreements (SLAs), which guarantee a particular level of service. An SLA is a contractual obligation between the ISP and the respective customer that identifies details of the network services provided by the provider, such as a guaranteed availability of the service, amount of bandwidth, maximum latency, maximum packet loss, maximum amount of jitter and the like. Failure to provide the service level guarantee to the customer may result in consequences to the service provider. For example, the service provider may have to credit the customer's account when the SLA is not upheld.

For this reason, it is important for ISPs to monitor performance of the network to determine the existence of any service problems. For example, monitoring performance of the network may allow the ISP to determine whether or not bandwidth allocated to a particular customer must be increased in order to decrease latency or packet loss. Moreover, the ISP may be able to monitor capacity of network devices, such as routers, and upgrade or expand the network devices to increase the capacity of the network, thereby decreasing packet loss, delay, and the like.

SUMMARY

In general, techniques are described for monitoring performance of a network. In particular, network devices within the network gather performance information from one another using performance probes. The term "performance probe" generally refers to a data object, such as a data packet, that is issued from one network device to another to convey information describing performance of the network at the issuing network device. The performance information collected by the network devices may be used to monitor the performance of the network and, more particularly, the quality of network provided services.

In accordance with one aspect of the invention, the network devices support a form of "self-configuration" in which they dynamically learn of other network devices throughout a network that support performance monitoring and construct a "performance community" for collecting comprehensive performance information. More specifically, the network devices exchange identification information in accordance with one or more routing communication protocols to establish the performance community. Examples of routing protocols that may be used include the Border Gateway Protocol (BGP), Open Shortest Path First (OSPF), Intermediate System—Intermediate System (ISIS) or the like.

For example, a network device that supports performance monitoring and self-configuration may generate a BGP communication that includes a particular BGP community value. The particular BGP community value advertises that the sending network device supports performance monitoring. In response, the receiving network devices update performance community information to incorporate the sending network device into the performance community. In this manner, the network devices utilize one or more routing communication protocols to dynamically establish a performance community of distributed network devices.

As described in detail, the network devices of the performance community collect network performance information using performance probes. Particularly, each of the network devices sends one or more performance probes to at least a portion of the other network devices to collect information that may be used to compute performance characteristics of the network. For example, a first one of the network devices (the probing device) may generate and send a set of performance probes to a second one of the network devices of the performance community. Information within each of the performance probes of the set may specify the same quality of service (QoS) to ensure that the probes receive similar routing treatment as the probes travel from the first network device to the second network device. In addition, the probing device adds a timestamp to each of the performance probes to indicate the time at which each of the performance probes was sent. The probing device may begin to generate and send another set of performance probes after the first set of performance probes are sent. The second set of performance probes may be destined for the same destination network device, i.e., the second network device, but have a different QoS.

Upon receiving a performance probe, the second network device returns a response that includes the received performance probe and an additional timestamp indicating the time at which the performance probe was received. The probing device processes the response to maintain network performance information. In particular, the probing device updates performance information based on the time at which the original probe was sent, the time at which the probe was received by the second network device, and a time at which the response was received by the probing device. Additionally, the probing device may use the collected performance information to compute performance statistics such as the delay from the first network device to each of the other network devices, the delay from the other network devices to the first network device, the roundtrip delay, average delays (both ways and roundtrip), maximum delays, minimum delays, jitter, throughput, and packet loss. In this manner, the probing device monitors network performance characteristics between the probing device and the second network device. Moreover, as the probing device may send sets of probes having different QoS levels, the relationship of the network performance characteristics and various QoS levels may be monitored.

Each of the other network devices of the performance community may collect performance information and compute performance statistics in a similar fashion. The network devices of the performance community may send the performance information collected via the performance probes or the computed performance characteristics to computing device that aggregates the performance information or characteristics in order to produce comprehensive network statistics. The comprehensive network statistics may be displayed to a network administrator to monitor the performance of the network. Moreover, the centralized computing device may perform data analysis to assist the network administrator in making informed network administration decisions. The network administrator may, for example, monitor the quality of network provided service level agreements (SLAs). The centralized computing device may display the collective network statistics to network administrator in real-time, in a periodic report, e.g., a daily or weekly report, or upon request by the network administrator. Based on the comprehensive network statistics as well as the data analysis, the network administrator may be able to identify or predict capacity problems within the network, bandwidth problems, or other problems associated with failure or potential failure to meet the requirements of one or more SLAs.

In one embodiment, the invention provides a method comprising receiving a routing communication in accordance with a routing protocol, wherein the routing communication identifies at least one network device that supports performance monitoring of a network and sending a performance probe to the network device to collect network performance statistics.

In another embodiment, the invention provides a network device comprising a routing communication manager that receives a routing communication in accordance with a routing protocol and that specifies a plurality of network devices and indicates that at least one of the network devices supports performance monitoring, wherein in response to the routing communication the routing communication manager dynamically generates a data structure that identifies the network devices that support performance monitoring.

In a further embodiment, the invention provides a system comprising a plurality of network devices that exchange routing communications with one another in accordance with a routing protocol to identify network devices that collect network performance information via performance probes and a statistical computing device that aggregates performance information from the network devices and computes collective network performance information for the network devices based on the aggregated performance information.

In yet another embodiment, the invention provides a network device a routing communication manager that exchanges routing communications in accordance with a routing protocol with other network devices of the network to define a community that collects network performance information using performance probes and a performance monitoring service card that manages performance probing sessions with the network devices of the community.

In another embodiment, the invention provides a computer-readable medium comprising instructions that cause a processor to receive a routing communication in accordance with a routing protocol, wherein the routing communication identifies at least one network device that supports performance monitoring of a network and send a performance probe to the network device to collect network performance statistics.

The invention may provide one or more advantages. For example, the techniques may allow network devices to dynamically establish performance communities for collecting network performance information for a network. As a result, the techniques may avoid significant administrative resources that otherwise would be necessary to manually configure the network devices to establish a performance community for collecting the performance characteristics of network. Furthermore, aggregation of performance information collected by the network devices of the performance community allows network administrators to view collective network performance information instead of separate performance information for each of the network devices.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
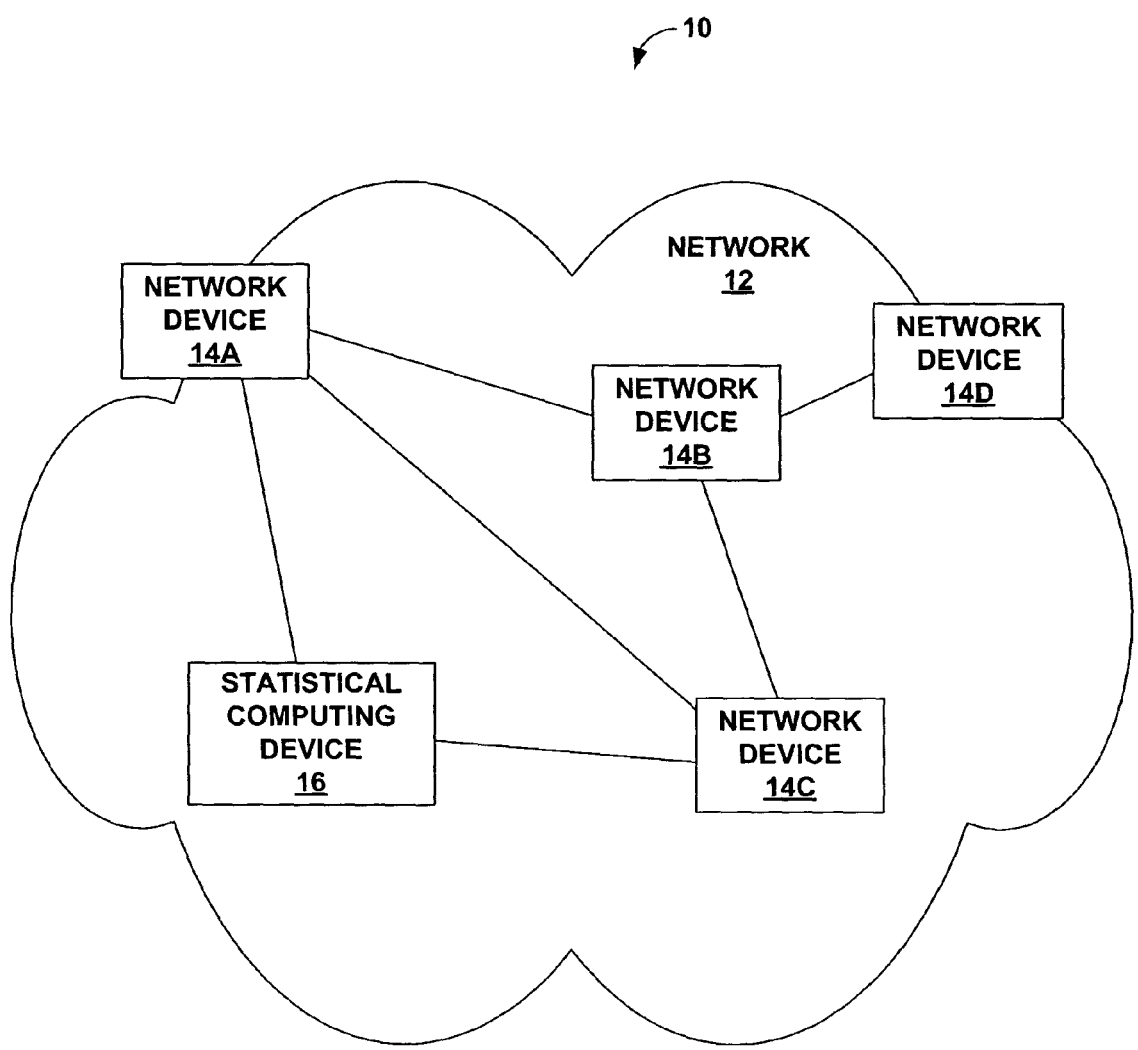
FIG. 1 is a block diagram illustrating an exemplary network performance monitoring system for monitoring performance characteristics of a network.

FIG. 1 is a block diagram illustrating an exemplary network performance monitoring system 10 for monitoring performance characteristics of network 12. In particular, network 12 comprises network devices 14A-14D ("network devices 14") that gather performance information from one another using performance probes. The term "performance probe" generally refers to a data object, such as a data packet, used to obtain information regarding performance of network 12 and, more particularly, the quality of network provided services. As will be described in detail, network devices 14 send and receive performance probes between each other in order to compute network performance characteristics such as delay, jitter, availability, packet loss and the like.

In accordance with the principles of the invention, network devices 14 support a form of "self-configuration" in which the network devices dynamically construct a "performance community" for collecting comprehensive performance information. The term "performance community" generally refers to a set of network devices that support performance monitoring of network 12. To establish the performance community, network devices 14 utilize one or more routing protocols, e.g., Border Gateway Protocol (BGP), in a modified fashion to indicate their support for self-configured performance monitoring. For example, network device 14A may broadcast a routing communication that includes an IP address associated with network device 14A and a uniquely defined BGP community value that indicates to other network devices that network device 14A supports performance monitoring. In this manner, each of network devices 14 may identify other network devices within network 12 that support performance monitoring and dynamically establish a performance community without the need for a network administrator to manually configure each of network devices 14. As a result, the techniques may avoid significant administrative resources that otherwise would be necessary to manually configure network devices 14 to establish the performance community for collecting the performance characteristics of network 12.

Network devices 14 communicate data within network 12 and between network 12 and other networks. For example, network 12 may comprise a plurality of networks, such as local area networks, mobile networks, broadband access networks, and the like. A portion of network devices 14 may, therefore, serve as gateway devices within network 12 or between network 12 and other networks. Moreover, network devices 14 may be distributed throughout network 12, and may include any type of network device, such as core routers, dedicated access edge routers, consumer edge routers, cable modem termination systems (CMTSs), broadband remote access servers (BRAS), gateway GPRS support nodes (GGSNs), or any combination thereof. In this manner, the techniques may be utilized to provide comprehensive "end-to-end" performance monitoring of network 12.

As described above, network devices 14 collect network performance information via performance probes in order to monitor the performance of network 12. Particularly, each of network devices 14 of a performance community sends performance probes to at least a portion of the other network devices 14 to collect information that may be used to compute performance characteristics of network 12. The performance characteristics that may be computed include, for example, delay, jitter, availability, throughput, packet loss and the like. For example, network device 14A may send performance probes to network devices 14B-14D to collect performance information for network infrastructure between network device 14A and each of network devices 14B-14D. Network device 14A may, for instance, send a set of performance probes, e.g., ten back-to-back probes, to network device 14B. Each of the performance probes of the set may be sent at a periodic rate over an interval of time, e.g., one performance probe sent every second for ten seconds for the case of a set of ten performance probes.

Upon receiving each of the performance probes, network device 14B returns a respective response that includes the received performance probe and an additional timestamp indicating the time at which the respective performance probe was received by network device 14B. In some embodiments, network device 14B may send a respective response to network device 14A immediately upon receiving each of the performance probes and a single timestamp may indicate the time at which network device 14B received the performance probe and the time at which network device 14B sent the response probe. In other embodiments, network device 14B may not send a respective response to network device 14A immediately in which case network device 14B may include a pair of timestamps along with the received performance probe, one of the timestamps indicating the time at which network device 14B received the performance probe and the other indicating time at which network device 14B sent the response.

Network device 14A processes the responses to maintain network performance information. In particular, network device 14A updates performance information based on the timestamp indicating a time at which the original probe was sent, the time at which the probe was received by the second network device, and a time at which the response was received by the first network device. Network device 14A may compute performance characteristics representative of network conditions between network device 14A and 14B using the performance information collected via the performance probes. Network device 14A may, for example, use the performance information collected via the probes to compute the delay from network device 14A to 14B, the delay from 14B to 14A, the roundtrip delay (14A to 14B and back to 14A), average delays (both ways and roundtrip), maximum delays, minimum delays, jitter, throughput, packet loss, as well as additional performance characteristics.

Likewise, network device 14A may send one or more performance probes to network devices 14C and 14D to collect additional performance information. Although in the illustrated example, network device 14A gathers performance information for all network devices 14, network device 14A may alternatively only collect performance information for a subset of network devices 14 of network performance monitoring system 10.

Each of network devices 14 sends performance probes to all or a subset of the other network devices 14 in a similar fashion. For example, network device 14B may collect performance information between network device 14B and all the other network devices, i.e. network device 14A, 14C and 14D. In this way, network devices 14 collect enough performance information to monitor the quality of network services provided to customers. Network devices 14 may collect performance information periodically, e.g., periodically throughout a day, a week, a month or a year. For example, network devices 14 may collect performance information once every hour. In other words, network devices 14 may send and receive performance probes to and from other network devices 14 once every hour. Additionally, network devices 14 may spread the collection of performance information over the periodic interval in order to reduce the amount of traffic injected into network 12 at a particular time. For example, if a network has four network devices, such as network 12 of FIG. 1, and periodically collects performance information once every four hours, a different one of network devices 14 may collect performance information every hour. For example, during the first hour network device 14A may collect performance information from network devices 14B-14D, during the next hour network device 14B may collect performance statistics from network devices 14A 14C and 14D, and so on.

Network devices 14 may send the performance information collected via the performance probes or the computed performance characteristics, or both, to statistical computing device 16, which aggregates the information to produce comprehensive network statistics. Moreover, statistical computing device 16 may perform data analysis to assist the network administrator in making informed network administration decisions. The collective network statistics may be displayed to a network administrator to monitor the performance of network 12. The network administrator may, for example, monitor the quality of network provided service level agreements (SLAs). Statistical computing device 16 may display the collective network statistics to network administrator in real-time, in a periodic report, e.g., a daily or weekly report, or upon request by the network administrator. The network administrator may be able to identify capacity problems within network 12, bandwidth problems, or other problems associated with failure or potential failure to provide terms of SLA'S. In addition, statistical computing device 16 may generate other reports for clients showing the statistics of the services provided to that particular client. Statistical computing device 16 may, for example, be located within a network operating center.

Although for exemplary purposes the auto-configuration techniques for establishing a performance community are described in reference to BGP, the techniques may be applied by other routing communication protocols, such as Open Shortest Path First (OSPF), Intermediate System—Intermediate System (ISIS), Routing Information Protocol (RIP) or the like. Moreover, multiple performance communities may be established throughout network 12 using one or more network protocols. For example, an inter-border performance community may be established within network 12 using BGP, while one or more intra-border performance communities may be established using IS-IS, IBGP, OSPF, RIP and the like. The multiple performance communities may utilize respective computing devices to aggregate the performance information, or a common, centralized computing device may be used to aggregate performance information from all of the performance communities. Further, network 12 may include a wide variety of computing devices of which only a subset of the computing devices support performance monitoring.

Figure 2:
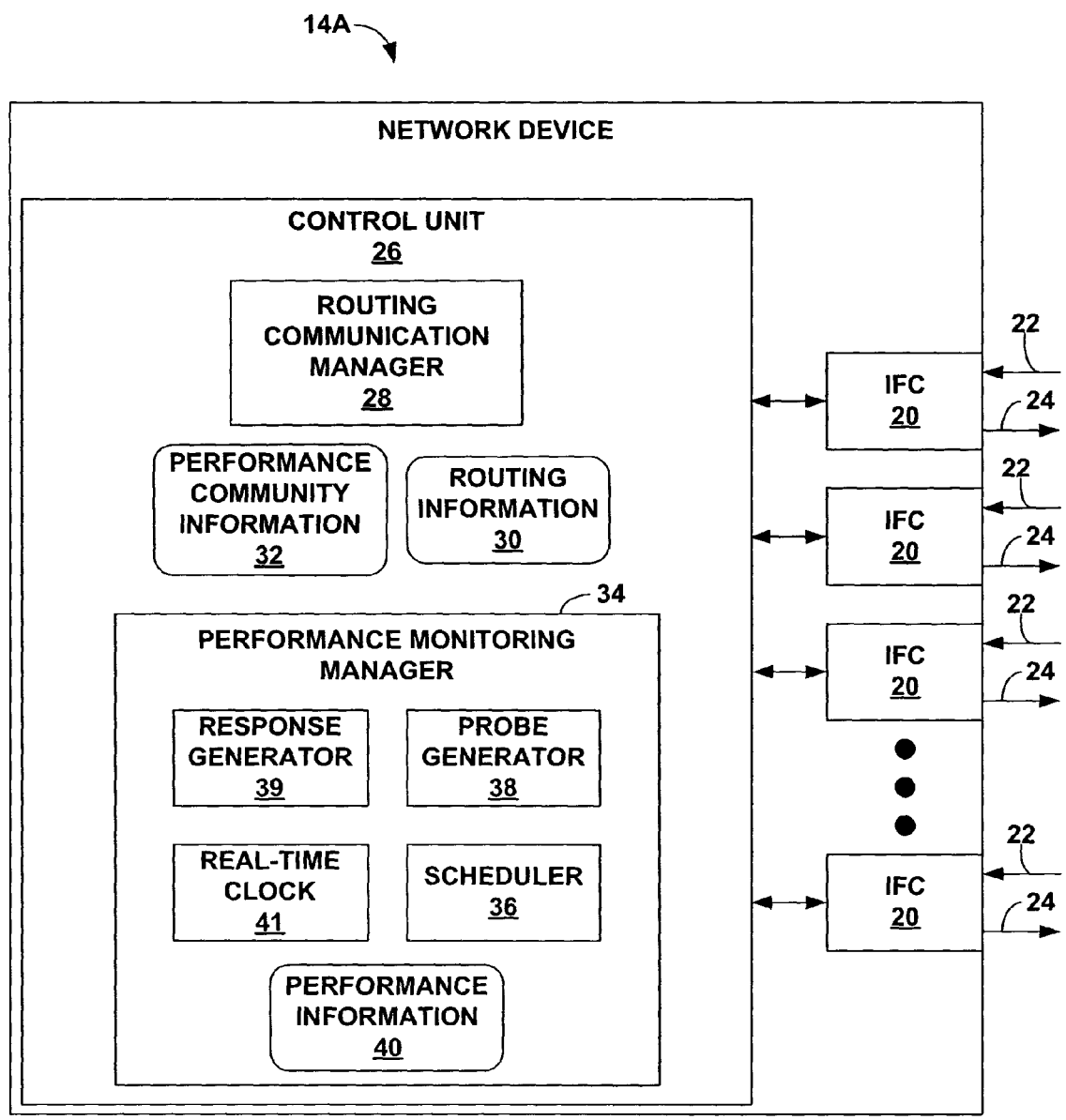
FIG. 2 is a block diagram illustrating an example embodiment of a network device that performs network monitoring.

FIG. 2 is a block diagram illustrating one exemplary embodiment of a network device that supports auto-configuration of network monitoring, such as network device 14A, in further detail. As described above, network device 14A sends performance probes to and receives performance probes from other network devices to collect network performance characteristics of network 12.

In the illustrated embodiment, network device 14A includes interface cards 20 ("IFCs 20") that receive and send data flows via network links 22 and 24, respectively. IFCs 20 are typically coupled to network links 22 and 24 via a number of interface ports (not shown). IFCs 20 communicate with a control unit 26 via one or more physical and/or logical interfaces.

Network device 14A includes a routing communication manager 28 executing within control unit 26 that receives routing communications and extracts information from the routing communications. In other words, routing communication manager 28 implements one or more routing protocols to learn routes from peer devices, such as other network devices 14. Specifically, routing communication manager 28 receives routing communications in accordance with the routing protocols that identify routes within network 12. Based on the communications, routing communication manager 28 maintains and updates routing information 30 to describe a topology of network 12, and more particularly, routes through network 12. For example, routing information 30 may include route data that describes various routes through network 12, and also next hop data indicating appropriate neighboring devices within network 12 for each of the routes. Routing communication manager 28 periodically updates routing information 30 to accurately reflect the current topology of network 12.

Additionally, routing communication manager 28 may extract information from the routing communications to automatically generate and maintain performance community information 32. Performance community information 32 describes one or more performance communities of network devices that monitor performance characteristics of network 12. In one embodiment, performance community information 32 may, for instance, define a plurality of network addresses corresponding to other network devices 14 within network 12 that participate in performance monitoring and support the automatic establishment of performance communities using routing protocols. Routing communication manager 28 further communicates routing communications to other network devices within network 12 using routing communication protocols, such as BGP, in order to include network device 14A in the performance community.

Control unit 26 also includes a performance monitoring manager 34 that manages performance communication sessions between network device 14A and other network devices of the performance monitoring communities. In particular, performance monitoring manager 34 manages the sending of performance probes to network devices identified within performance community information 32. In addition, performance monitoring manager 34 is responsible for responding to performance probes from other network devices of the performance community.

Performance monitoring manager 34 includes a scheduler 36 that schedules probing sessions with network devices identified by performance community information 32. Scheduler 36 may, for example, maintain one or more probe timers that track time intervals between probing sessions with the network devices identified by performance community information 32. Performance monitoring manager 34 further includes a probe generator 38 that generates performance probes for sending to network devices identified by performance community information 32 and a response generator 39 for responding to performance probes received by network device 14A. In addition, performance monitoring manager 34 includes a real-time clock 41 for use in assigning timestamps to the generated performance probes as well as the responses.

As described above, network device 14A collects performance information in order to monitor performance characteristics of the network infrastructure providing connectivity between network device 14A and at least a portion of the other network devices 14 of the established performance community. Initially, e.g., upon boot-up, network device 14A exchanges identification information with other network devices within network 12 to establish one or more performance communities using one or more routing communication protocols, such as BGP, IBGP, ISIS, OSPF, RIP, or the like. During this process, network device 14A identifies the other network devices 14 of network 12 that support performance monitoring. For example, network device 14A may send a routing communication that includes an IP address associated with network device 14A and a particular BGP community value that advertises to other network devices 14 that network device 14A supports performance monitoring. The other network devices 14 update their respective performance community information to include the IP address associated with network device 14A, thereby incorporating network device 14A into the performance community.

Likewise, network device 14A receives information via a routing communication protocol identifying the other network devices 14 that support performance monitoring and updates performance community information 32 to identify the network devices. In this manner, network devices 14 may utilize an existing routing communication protocol in a modified way to automatically establish a performance community. This technique may avoid significant administrative resources that otherwise would be necessary to manually configure network devices 14 to establish a performance community for collecting the performance characteristics of network 12.

To collect performance information performance monitoring manager 34 sends performance probes to one or more of network devices 14 identified by performance community information 32. For example, scheduler 36 may wait for one of the probe timers to expire, indicating that it is time to initialize probing sessions once again. As described above, the probe timers track the amount of time between performance probing sessions. Upon expiration of one of the probe timers maintained by scheduler 36, network device 14A begins sending performance probes to other network devices that support performance monitoring, i.e., other network devices of the established performance community.

Performance monitoring manager 34 may, for example, send sets of performance probes to other network devices 14 in accordance with performance community information 32. More specifically, upon expiration of timer 36, probe generator 38 generates a set of one or more performance probes addressed to one of the other network devices of the performance community. Probe generator 38 may, for example, generate each of the performance probes of each of the sets to have the same quality of service (QoS), thereby ensuring that each of the performance probes receives the same routing treatment throughout network 12. Performance monitoring manager 34 adds a timestamp to each of the performance probes in accordance with real-time clock 41 and sends the set of performance probes to the destination network device via network 12. Performance monitoring manager 34 may, for example, send each of the performance probes of the set to the destination network device at a periodic rate over an interval of time. For example, performance monitoring manager 34 may send the performance probes of the set at a rate of one performance probe each second until all the performance probes of the set have been sent. In this manner, performance manager 34 may send the performance probes for a given one of the sets over a defined time interval to achieve a more accurate view of a network conditions for the respective QoS level.

Performance monitoring manager 34 may begin to generate another set of performance probes after the first set of performance probes are sent, thereby minimizing the impact of the measurements and the actual network conditions. For example, probe generator 38 may generate a second set of performance probes destined for the same destination network device, but with a different QoS level. Performance measurement manger 34 attaches timestamps to each of the performance probes and sends the probes over a time interval, as described above. In this manner, performance monitoring manager 34 monitors performance characteristics of different QoS levels for the network infrastructure between the destination one of network device 14 and network device 14A.

Performance monitoring manager 34 may also generate and send performance probes to other network devices 14 within the performance community. In some instances, performance monitoring manager 34 may generate and send sets of performance probes to each of network devices 14 within the performance community. For each of the network devices within the performance community, network device 14A may send performance probes for various QoS levels. In other words, network device 14A monitors performance characteristics for different QoS levels between it and one or more of network devices 14 of the performance community.

Additionally, network device 14A and, more particularly, performance monitoring manager 34 receives responses to the performance probes from the other network devices within the performance community and adds a timestamp to the responses to indicate the time at which the responses were received from the destination network device. Specifically, the other network devices receive the performance probes from network device 14A and send a response that includes the received performance probe and a timestamp indicating the time at which the device received the corresponding performance probe. However, in some embodiments, the destination network device may receive the performance probe and compute performance characteristics, such as delay from the source device, e.g., network device 14A, and include the computed performance characteristics in the response.

Performance monitoring manager 34 responds to performance probes from other network devices 14 within the performance community in similar fashion. Particularly, performance monitoring manager 34 receives the performance probes, response generator 38 generates a response to each of the performance probes that may include, for example, the received performance probe and other information, such as a timestamp indicating the time at which network device 14A received the performance probes, and sends the responses back to the respective sources of the performance probes. As described above, the responses may simply be a copy of the original performance probes and timestamps indicating the time at which the network device 14A received the respective performance probe.

Performance monitoring manager 34 stores the performance information collected via the performance probes in performance information 40. Additionally, performance monitoring manager 34 may compute performance statistics from the collected performance information and store the computed performance statistics in performance information 40. Particularly, performance monitoring manager 34 may compute numerous performance characteristics using the timestamp information from the performance probes. For example, performance monitoring manager 34 may compute delay from network device 14A to each of the other network devices 14, the delay from the other network devices 14 to network device 14A, the roundtrip delay, average delays (both ways and roundtrip), maximum delays, minimum delays, jitter, throughput, and packet loss.

In addition, network device 14A may forward the performance information, the computed performance characteristics, or both, to a centralized statistical computing device 16, which aggregates the statistical information collected by each of network devices 14 in order to attain collective network statistics. A network administrator or an autonomous entity executing in device 16 may use the collective network statistics to identify problems within the network services provided to customers. The collective network statistics may, for example, be used to monitor the service level agreements (SLAs) of a network provider. Statistical computing device 16 may display the information to the network administrator in real-time, in a periodic report, e.g., a daily or weekly report, or upon request by the network administrator. The network administrator or an autonomous entity may be able to identify capacity problems within network 12, bandwidth problems, or other problems associated with failure or potential failure to provide terms of SLA's. In addition, the network administrator may generate other reports for clients showing the statistics of the services provided to that particular client.

Control unit 26 may operate according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. The functions of network device 14A may be implemented by executing the instructions of the computer-readable medium with one or more processors, discrete hardware circuitry, firmware, software executing on a programmable processor, or a combination of any of the above.

Figure 3:
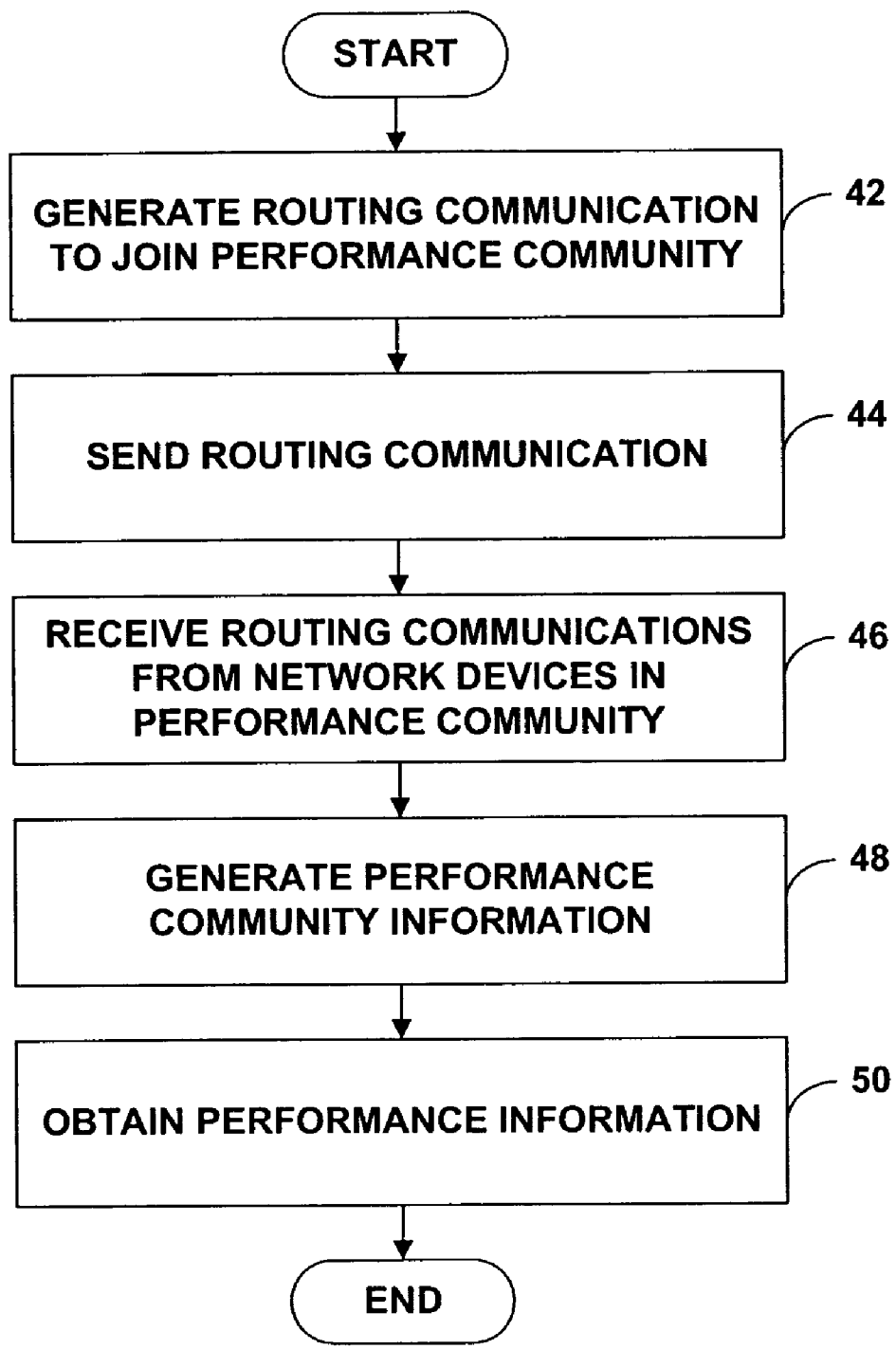
FIG. 3 is a flow diagram illustrating exemplary operation of a network device establishing a performance community for collection of performance information to monitor network.

FIG. 3 is a flow diagram illustrating exemplary operation of a network device, such as network device 14A, to automatically establish a performance community for collection of performance information to monitor network 12. Initially, network device 14A generates a routing communication that identifies network device 14A as a network device capable of participating in an automatically-established performance community for monitoring network performance in accordance with the invention (42). In one embodiment, the routing communication includes an identifier associated with network device 14A and an indicator that specifies the capability of network device 14A to support performance monitoring. For example, the routing communication may comprise a BGP communication that includes a defined BGP community value associated with the performance community and an IP address corresponding to network device 14A. The BGP communication may further specify other network devices 14 of which network device 14A is aware that support performance monitoring. Network device 14A communicates the routing communication to other network devices 14 within network 12 (44). In response, the receiving network devices 14 update their respective performance community information to include network device 14A as a part of the performance community.

Additionally, network device 14A receives routing communications from the other network devices 14 within network 12 (46) and generates performance community information 32 based on the received routing communications (48). For example, network device 14A may receive one or more BGP communications from other ones of network devices 14 of network 12 that include the defined BGP community value associated with the performance community and an IP addresses corresponding to the other ones of network devices 14. Network device 14A extracts the network address identifier from the BGP packets, e.g., the IP addresses, and generate performance community information 32 to include define the network devices of the performance community. In this manner, performance community information 32 describes a performance community of network devices that monitor performance characteristics of network 12. Specifically, performance community information 32 may, for instance, define a plurality of network addresses corresponding to network devices within network 12 that participate in performance monitoring.

In this manner, each of network devices 14 may identify network devices 14 that support performance monitoring, i.e., network devices 14 of the performance community, and send performance probes to network devices 14 of the performance community without the need for a network administrator to manually configure each of network devices 14 to collect performance information. The techniques may reduce or eliminate the need for administrators to manually configure network devices 14 to collect network performance information. As a result, the techniques may avoid significant administrative resources that otherwise would be necessary to manually configure network devices 14 to collect the performance characteristics.

Network device 14A obtains performance information of network 12 using the generated performance community information 32 (50). As described above, network device 14A collects network performance information via performance probes in order to monitor the performance of network 12. Particularly, network device 14A sends performance probes to at least one of network devices 14 to collect information that may be used to compute performance characteristics of network 12. Network device 14A may, for example, send a set of one or more performance probes, e.g., ten back-to-back probes, to another one of network devices 14. Network device 14A receives responses to the performance probes that include timestamps indicating network transit times. The performance information may be used to calculate performance characteristics such as delay, jitter, availability, throughput, packet loss and the like.

Figure 4:
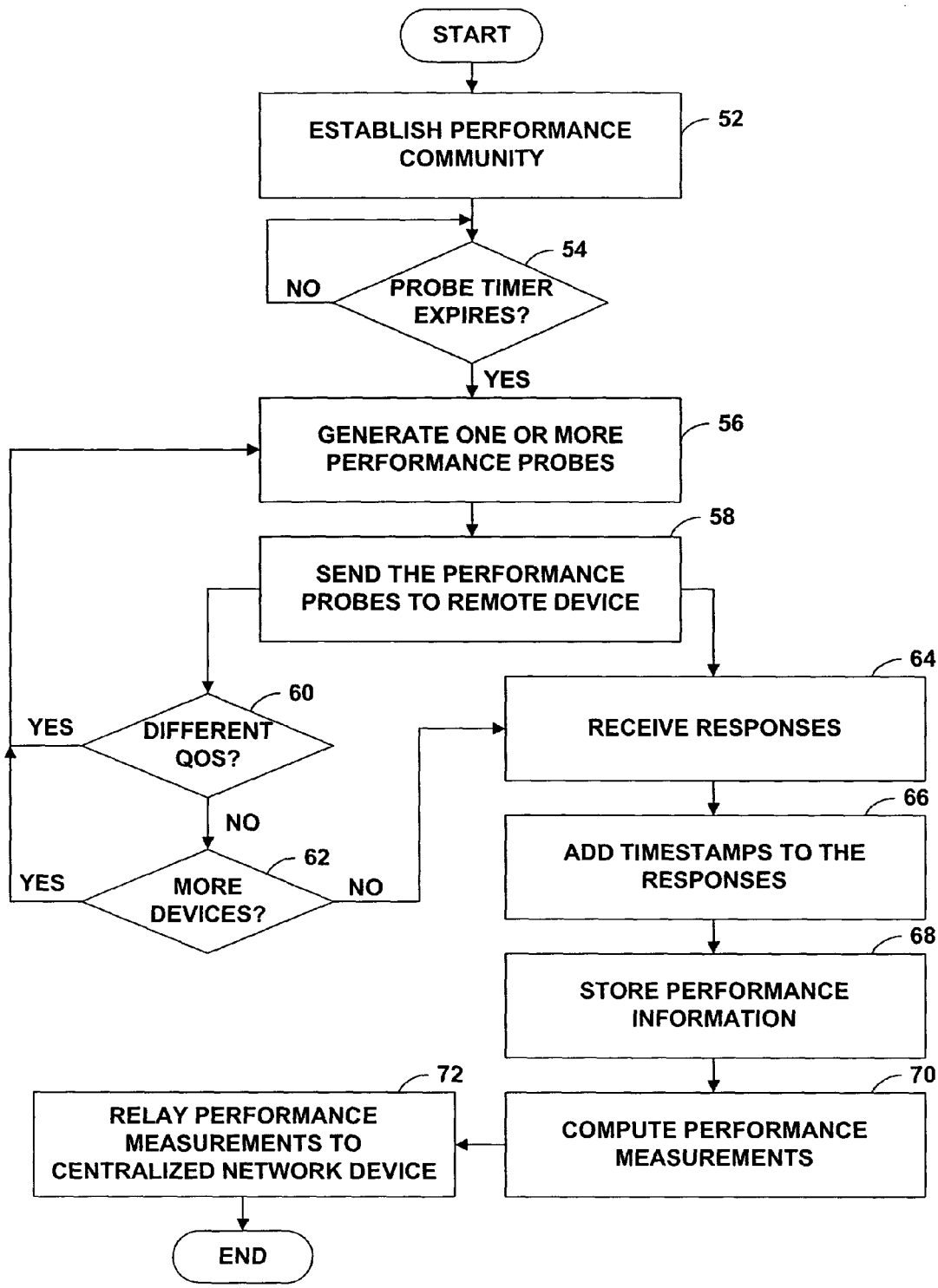
FIG. 4 is a flow diagram illustrating exemplary operation of a network device collecting performance information via performance probes.

FIG. 4 is a flow diagram illustrating exemplary operation of a network device, such as network device 14A, when obtaining performance information from a target device, e.g., network device 14B, via performance probes. Initially, network device 14A exchanges routing communications with other network devices within network 12 to establish a performance community, as described above with respect to FIG. 3, and initializes at least one probe timer maintained by scheduler 36 to define an interval between probing sessions (52).

Upon expiration of the probe timer maintained by scheduler 36 (54), network device 14A initiates a new probing session by constructing a set of one or more performance probes (56) and sending the performance probes to the target network device (58). Network device 14A may, for example, generate and send a set of performance probes to another one of the network devices 14 that is part of the performance community. Each performance probe of the set may address a particular one of the other network devices 14 of the performance community, specify the same QoS level, and include a timestamp that indicates the time at which network device 14A sent the respective performance probe.

After sending each of the performance probes of the set, network device 14A determines whether another set of probes specifying a different QoS level should be sent to the same network device (60). If network device 14A determines that another set of probes should be sent to the same network device of the performance community, network device 14A repeats the process to generate the set of probes addressed to the same network device of the performance community, but with a different QoS level and send the set of performance probes (58, 60).

If all of the QoS levels have been tested, network device 14A determines whether to send one or more performance probes to other network devices 14 within the performance community (62). If additional network devices 14 within the performance community are to be probed, network device 14A generates and sends the additional performance probes to the one or more network devices of the performance community (58, 60). As described above, network device 14A may send a set of probes to one or more network devices 14 or multiple sets of probes, e.g., each set having probes that specify a different QoS level.

Network device 14A receives responses from the probed network devices 14 within the performance community (64). More particularly, the targeted network devices 14 receive the performance probes from network device 14A and send responses back to network device 14A that include the received performance probes and timestamps indicating the time at which the device received the performance probes. Additionally, network device 14A adds timestamps to the responses indicating the time at which the responses were received (66) and stores the information contained within the responses (68). More specifically, network device 12A may store an identifier of the network device from which the responses were sent along with all of the timestamps within the responses within performance information 40. The timestamps within the responses may include timestamps indicating the time at which the performance probes were sent by network device 14A, the time at which the performance probes were received, the time at which the responses were sent, and the time the responses were received by network device 14A.

Network device 14A may use performance information obtained from the performance probes to compute one or more performance characteristics of traffic between network device 14A and another one of the network devices of the performance community (70). Network device 14A may compute, for example, the delay from network device 14A to the other network device, the delay from the other network device to network device 14A, the roundtrip delay, average delays (both ways and roundtrip), maximum delays, minimum delays, jitter, throughput, packet loss, as well as additional performance characteristics.

In addition, network device 14A may relay performance information obtained via the performance probes, computed performance characteristics or both to centralized statistical computing device 16 (72). Centralized statistical computing device 16 may aggregate the statistical information collected by each of network devices 14 of the performance community in order to produce comprehensive network statistics. Moreover, statistical computing device 16 may perform data analysis to assist the network administrator or an autonomous entity in making informed network administration decisions. The network administrator or autonomous entity may use the collective network statistics as well as the analysis of the statistics to identify problems within the network services provided to customers. The collective network statistics may, for example, be used to monitor service level agreements (SLAs) provided by an ISP maintaining network 12. Statistical computing device 16 may display the information to network administrator in real-time, in a periodic report, e.g., a daily or weekly report, or upon request by the network administrator. The network administrator or autonomous entity may be able to identify capacity problems within network 12, bandwidth problems, or other problems associated with failure or potential failure to provide terms of SLA's.

Figure 5:
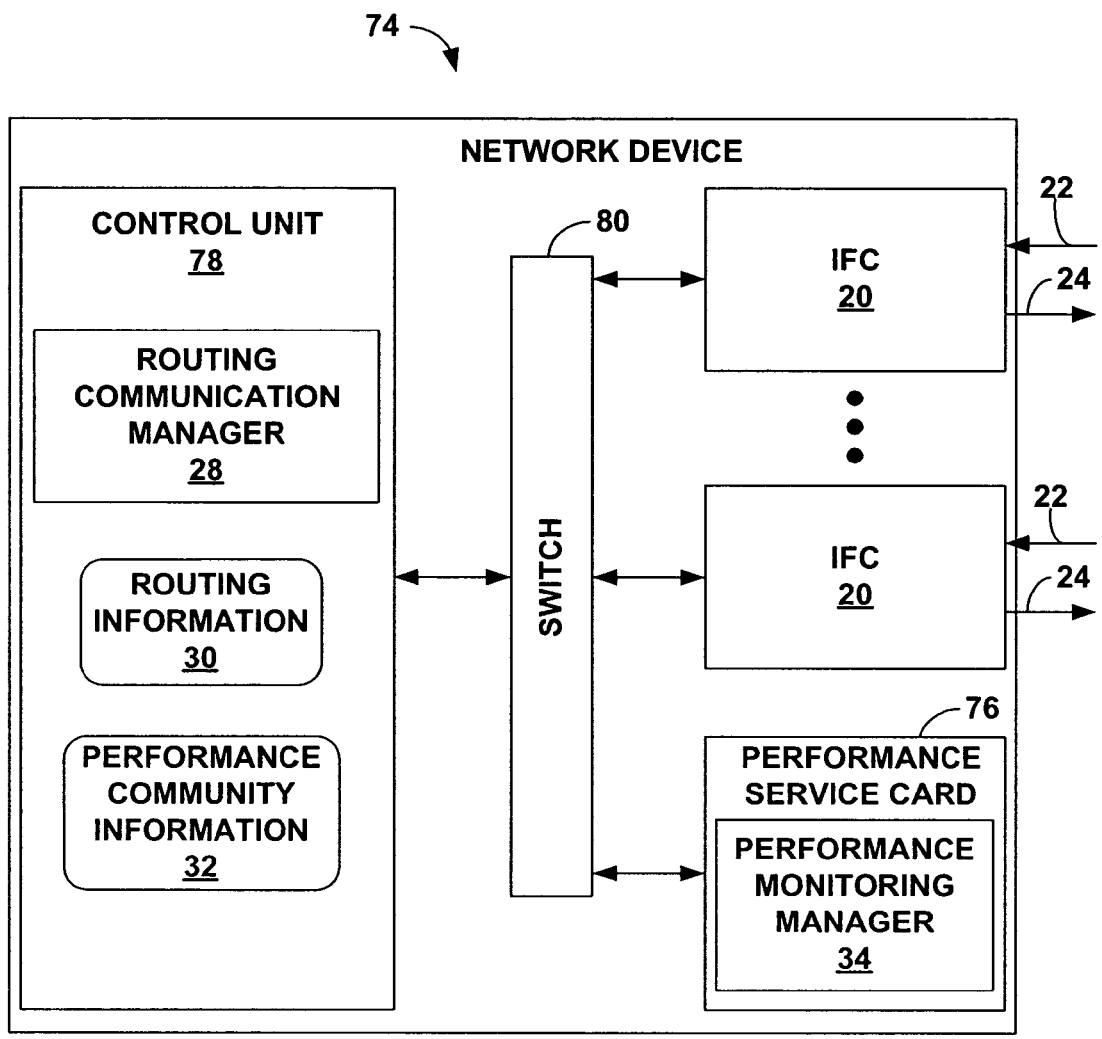
FIG. 5 is a block diagram illustrating another exemplary network device that includes a dedicated service card to perform network monitoring in accordance with the principles of the invention.

FIG. 5 is a block diagram illustrating another exemplary embodiment of a network device 74 that supports auto-configuration of network monitoring. Network device 74 conforms substantially to network device 14A of FIG. 2, but includes a dedicated performance service card 76 that performs the performance monitoring functionality. Particularly, network device 74 includes performance service card 76 that manages performance communication sessions between network device 74 and other network devices of an established performance monitoring community.

Network device 74 includes interface cards 20 ("IFCs 20") that are coupled to a control unit 78 and performance service card 76 via a switch 80. IFCs 20 communicate with control unit 78 and performance service card 76 via one or more physical and/or logical interfaces and switch 80. In this manner, IFCs 20 may communicate directly with performance service card 76, thereby enhancing the accuracy of timestamps. Additionally, control unit 78 and performance service card 76 may also directly communicate with one another via switch 80.

Control unit 78 includes a routing communication manager 28 executing within control unit 26 that receives routing communications and extracts information from the routing communications. Specifically, routing communication manager 28 receives routing communications in accordance with the routing protocols that identify routes within network 12 maintains and updates routing information 30 based on the routing communications. Additionally, routing communication manager 28 exchanges routing communications with other network devices within a network to automatically generate and maintain a performance community to monitor performance characteristics of the network, as described in detail above.

Performance service card 76 includes a performance monitoring manager 34 that manages the sending of performance probes to network devices of the established performance community as described in detail above with reference to FIG. 2. In addition, performance monitoring manager 34 is responsible for responding to performance probes from other network devices of the performance community. In another embodiment, the functionality of performance monitoring manager 34 may be distributed or otherwise allocated to one or more of IFCs 20, and network device 74 may not necessarily include a dedicated service card.

Various embodiments of the invention have been described. These and other embodiments are within the scope of the following claims.

The invention claimed is:

1. A method to dynamically establish a performance community of distributed network devices, the method comprising:
   receiving a routing communication in accordance with a routing protocol, wherein the routing communication includes an identifier associated with a network device that sent the routing communication and a uniquely defined routing protocol community value that indicates the network device that sent the routing communication is capable of responding to performance probes used to monitor performance of a network, wherein the routing protocol comprises one of Border Gateway Protocol (BGP), Open Shortest Path First (OSPF), Intermediate System—Intermediate System (ISIS), and Routing Information Protocol (RIP);
   updating performance community information to incorporate the network device that sent the routing communication into the performance community; and
   sending a performance probe to the network device identified by the identifier to collect network performance statistics.

2. The method of claim 1, wherein receiving the routing communication includes receiving a plurality of routing communications that each identify respective network devices that are capable of responding to performance probes and further comprising dynamically generating data to identify the network devices that are capable of responding to performance probes in response to the routing communications.

3. The method of claim 1, wherein the routing communication further includes routing information describing a topology of the network.

4. The method of claim 1, further comprising:
   generating an outbound routing communication in accordance with the routing protocol; and
   sending the outbound routing communication to the network device associated with the identifier via the routing protocol, wherein the outbound routing communication identifies at least the sending network device as a supporter of performance monitoring.

5. The method of claim 1, further comprising generating the performance probe to include a timestamp that indicates a time at which the probe was sent.

6. The method of claim 1, wherein sending the performance probe comprises sending a plurality of performance probes.

7. The method of claim 6, wherein each of the performance probes is addressed to a common destination network device.

8. The method of claim 6, wherein each of the performance probes is associated with the same quality of service level.

9. The method of claim 6, wherein sending the plurality of performance probes comprises sending the plurality of performance probes at a periodic rate over an interval of time.

10. The method of claim 6, wherein sending the plurality of performance probes comprises:
    sending a first performance probe having a first quality of service level to the network device; and
    sending a second performance probe having a second quality of service level to the network device.

11. The method of claim 1, further comprising:
    receiving a response to the performance probe from the network device;
    adding a timestamp to the response to indicate the time of reception of the response; and
    storing information contained in the response.

12. The method of claim 11, further comprising forwarding the stored information to a centralized computing device for computing comprehensive network performance statistics.

13. The method of claim 11, further comprising:
computing network performance statistics from the information contained in the response; and
forwarding the network performance statistic to a centralized device for computing comprehensive network performance statistics.

14. The method of claim 1, further comprising:
receiving an inbound performance probe from the network device; and
sending a response to the inbound performance probe to the network device, wherein the response to the performance probe includes the received performance probe and a timestamp indicating the time of reception of the inbound performance probe.

15. The method of claim 1, wherein the network performance statistics includes at least one of network delay, network jitter, network throughput, network availability and network packet loss.

16. The method of claim 1, wherein the routing protocol community value comprises a BGP community attribute that indicates the network device that sent the routing communication is capable of responding to performance probes.

17. A network device comprising:
a processor;
a first data structure to store routing information that describes a topology of a network;
a second data structure to store performance community information that identifies one or more network devices that are capable of responding to performance probes used to monitor the network; and
a routing communication manager executing on the processor wherein the routing communication manager receives a routing communication that identifies at least one route within a network and a routing protocol community value that indicates that a network device that sent the routing communication is capable of responding to performance probes used to monitor the network, updates the routing information of the first data structure to include the route identified in the routing communication and updates the performance community information of the second data structure to include the network device that sent the routing communication as one of the network devices capable of responding to performance probes,
wherein the routing protocol comprises one of Border Gateway Protocol (BGP), Open Shortest Path First (OSPF), Intermediate System—Intermediate System (ISIS), and Routing Information Protocol (RIP).

18. The network device of claim 17, wherein the routing communication manager of the network device generates an outbound routing communication in accordance with the routing protocol, and sends the outbound routing communication to at least one of the one or more network devices identified in the second data structure via a routing communication protocol, wherein the outbound routing communication identifies the network device as capable of responding to performance probes.

19. The network device of claim 18, wherein the outbound routing communication includes an identifier associated with the network device and a routing protocol community value that indicates the network device is capable of responding to performance probes.

20. The network device of claim 17, further comprising a performance monitoring manager that collects network performance statistics by sending one or more performance probes to at least a portion of the one or more network devices identified in the second data structure.

21. The network device of claim 20, wherein the performance probes include a timestamp indicating a time at which the performance probe is sent.

22. The network device of claim 20, wherein the performance monitoring manager sends a plurality of performance probes to one of the network devices identified in second data structure.

23. The network device of claim 22, wherein each of the plurality of performance probes is associated with a same quality of service level.

24. The network device of claim 22, wherein the performance monitoring manager sends each of the plurality of performance probes at a periodic rate over an interval of time.

25. The network device of claim 20, wherein the performance monitoring manager sends a first performance probe associated with a first quality of service level to a first one of the one or more network devices identified in the second data structure and a second performance probe associated with a second quality of service level to the first one of the network devices.

26. The network device of claim 20, wherein the performance monitoring manager receives a response to at least one of the performance probes, adds a timestamp to the response to indicate a time of reception of the response, and stores information contained in the response.

27. The network device of claim 26, wherein the performance monitoring manager forwards the stored information to a centralized computing device for computing comprehensive network performance statistics.

28. The network device of claim 26, wherein the performance monitoring manager computes the network performance statistics from the information contained in the response and forwards the network performance statistics to a centralized device for computing comprehensive network performance statistics.

29. The network device of claim 20, wherein the performance monitoring manager receives an inbound performance probe from one of the network devices identified in the second data structure and sends a response to the inbound performance probe, wherein the response includes the inbound performance probe and a timestamp indicating the time of reception of the inbound performance probe.

30. The network device of claim 20, further comprising a processor and wherein at least one of the routing communication manager and the performance monitoring manager comprises a software process executing on the processor.

31. The network device of claim 20, wherein at least one of the routing communication manager and the performance monitoring manager are executed in hardware.

32. The network device of claim 20, further comprising a dedicated service card that implements the performance monitoring manager.

33. The network device of claim 17, wherein the network performance statistics include at least one of network delay, network jitter, network throughput, network availability and network packet loss.

34. A system comprising:
at least one network device that receives routing communications in accordance with a routing protocol, wherein at least a portion of the routing communications include identifiers associated with network devices that sent the routing communications and routing protocol community values that indicate that the network device are capable of responding to performance probes used to monitor performance of a network, wherein the network device updates performance community information to incorporate the network devices that sent the routing communication into a performance community and sends performance probes to the network devices associated with the identifiers to collect network performance information, wherein the routing protocol comprises one of Border Gateway Protocol (BGP), Open Shortest Path First (OSPF), Intermediate System—Intermediate System (ISIS), and Routing Information Protocol (RIP); and a statistical computing device that aggregates performance information from the network devices and computes collective network performance information for the network based on the aggregated performance information.

35. The system of claim 34, wherein the statistical computing device displays the collective network performance statistics to a user.

36. The system of claim 35, wherein the statistical computing device displays the network performance statistics to the user in real-time.

37. The system of claim 34, wherein each of the at least one network device collects performance information by sending performance probes to at least a portion of the network devices associated with the identifiers, receiving responses to the performance probes, and adding timestamps to the responses to indicate the time of reception of the responses.

38. A network device comprising:
a processor;
a routing communication manager executing on the processor that receives routing communications in accordance with a routing protocol, wherein at least a portion of the routing communications include identifiers associated with the network devices that sent the routing communications and routing protocol community values that indicate that the network devices are capable of responding to performance probes used to monitor performance of a network, wherein the routing communication manager updates performance community information to establish a performance community that includes the network devices that sent the routing communications, and wherein the routing protocol comprises one of Border Gateway Protocol (BGP), Open Shortest Path First (OSPF), Intermediate System—Intermediate System (ISIS), and Routing Information Protocol (RIP); and
a performance monitoring service card that manages performance sessions with the network devices associated with the identifiers by sending performance probes to the network devices to collect network performance statistics.

39. The network device of claim 38, wherein the performance monitoring service card generates performance probes and sends the performance probes to the network devices associated with the identifiers to collect network performance statistics, wherein each of the performance probes include a timestamp indicating a time at which the respective one of the performance probes was sent.

40. The network device of claim 38, wherein the performance monitoring service card receives a response to at least one of the performance probes, adds a timestamp to the response to indicate the time of reception of the response, and stores information contained in the response.

41. The network device of claim 38, wherein the performance monitoring service card receives an inbound performance probe from one of the network devices associated with a respective one of the identifiers and sends a response to the inbound performance probe, wherein the response to the inbound performance probe includes the inbound performance probe and a timestamp indicating the time of reception of the inbound performance probe.

42. A computer-readable storage medium comprising instructions that cause a processor to:
receive a routing communication in accordance with a routing protocol, wherein the routing communication includes a routing protocol community value associated with a network device that sent the routing communication and an indicator that indicates the network device that sent the routing communication is capable of responding to performance probes used to monitor performance of a network, wherein the routing protocol comprises one of Border Gateway Protocol (BGP), Open Shortest Path First (OSPF), Intermediate System—Intermediate System (ISIS), and Routing Information Protocol (RIP);
in response to the routing communication, incorporate the network device that sent the routing communication into a performance community of distributed network devices that are capable of responding to performance probes used to monitor performance of the network; and
send a performance probe to the network device identified by the identifier to collect network performance statistics.

43. The computer-readable storage medium of claim 42, further comprising instruction that cause the processor to:
generate an outbound routing communication in accordance with the routing protocol; and
send the outbound routing communication to the network device associated with the identifier via the routing protocol, wherein the outbound routing communication identifies at least the sending network device as capable of responding to performance probes.

44. The computer-readable storage medium of claim 42, further comprising instructions that cause the processor to generate the performance probe to include a timestamp that indicates a time at which the probe was sent.

45. The computer-readable storage medium of claim 42, further comprising instruction that cause the processor to:
receive a response to the performance probe from the network device to which the performance probe was sent;
add timestamp to the response to indicate the time of reception of the response; and
store information contained in the response.

46. The computer-readable storage medium of claim 45, further comprising instruction that cause the processor to further comprising forward the stored information to a centralized computing device for computing comprehensive network performance statistics.

47. The computer-readable storage medium of claim 42, further comprising instruction that cause the processor to:
receive an inbound performance probe from the network device; and
send a response to the inbound performance probe to the network device, wherein the response to the performance probe includes the received performance probe and a timestamp indicating the time of reception of the inbound performance probe.

* * * * *

UNITED STATES PATENT AND TRADEMARK OFFICE
CERTIFICATE OF CORRECTION

PATENT NO. : 7,606,887 B1  Page 1 of 1
APPLICATION NO. : 10/660303
DATED : October 20, 2009
INVENTOR(S) : Stewart et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1804 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,606,887 B1 | Page 1 of 1 |
| APPLICATION NO. | : 10/660303 | |
| DATED | : October 20, 2009 | |
| INVENTOR(S) | : Stewart et al. | |

It is certified that error appears in the above-identified patent and that said Letters Patent is hereby corrected as shown below:

On the Title Page:

The inventor name "Joe Truman" should read -- Truman Joe --

Column 18, line 30 (claim 43), "further comprising instruction that cause" should read -- further comprising instructions that cause --

Column 18, line 44 (claim 45), "further comprising instruction that cause" should read -- further comprising instructions that cause --

Column 18, line 51 (claim 46), "further comprising instruction that cause" should read -- further comprising instructions that cause --

Column 18, line 52 (claim 46), "further comprising forward the stored" should read -- forward the stored -- (delete "~~further comprising~~")

Column 18, line 56 (claim 47), "further comprising instruction that cause" should read -- further comprising instructions that cause --

Signed and Sealed this
Twenty-eighth Day of June, 2011

David J. Kappos
*Director of the United States Patent and Trademark Office*